Oct. 21, 1941.  C. G. MORGAN  2,259,478
GEOPHYSICAL EXPLORATION SYSTEM
Filed Oct. 1, 1938
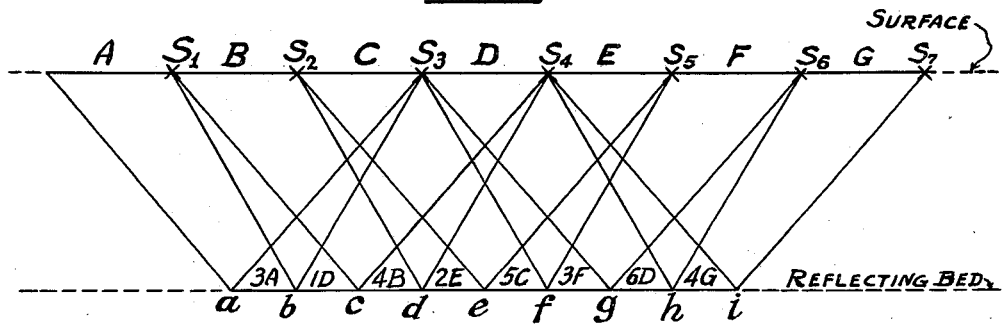
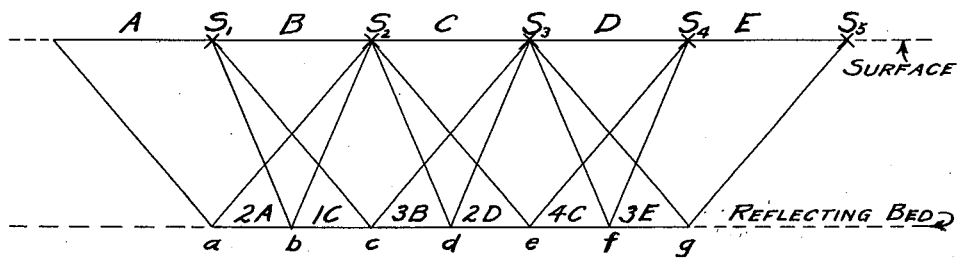
INVENTOR,
CHARLES GILL MORGAN.
BY
Lippincott & Metcalf
ATTORNEYS.

Patented Oct. 21, 1941

2,259,478

UNITED STATES PATENT OFFICE 2,259,478

GEOPHYSICAL EXPLORATION SYSTEM

Charles Gill Morgan, Pasadena, Calif., assignor, by mesne assignments, to Consolidated Engineering Corporation, Pasadena, Calif., a corporation of California Application October 1, 1938, Serial No. 232,892

12 Claims. (Cl. 181—0.5)

My invention relates to geophysical prospecting, and more particularly to an improved method of continuous subsurface exploration.

The principal object of my invention is to provide a new method for conducting continuous subsurface exploration not subject to the objections to methods used heretofore.

Another object is to provide means for recording reflected waves without the record being disturbed greatly by ground roll and other unwanted disturbances.

Another object of my invention is to provide a system for exploring a portion of the subsurface in cases where there are legal or physical obstructions preventing placing receptors or generating stations directly above the portions of subsurface to be explored.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawing:

Fig. 1 is a schematic plan view of a receptor pattern illustrating one form of my invention.

Fig. 2 is a schematic vertical section of apparatus shown in plan in Figs. 1 and 4.

Fig. 3 is a schematic vertical section beneath a receptor pattern, illustrating another form of my invention.

Fig. 4 illustrates a pattern of placing receptors for operation of my system alternate to that shown in Fig. 1.

This apparatus is claimed broadly in the copending Hoover-Morgan-Christie application Serial No. 324,822, filed March 19, 1940.

In the patterns illustrated, receptor gravity centers are indicated by dots and the surface projection of a generating point by an X. It is to be understood that the actual shot points are preferably below the weathered layer of the ground.

In general, geophysical exploration is conducted by establishing generating stations and receiving stations, producing physical disturbances in the earth at the generating stations, and recording the effects that such disturbances produce at the receiving stations.

In the most effective method of geophysical exploration, use is customarily made of earth disturbances in the form of artificially created seismic waves. Usually these seismic waves are created by detonating a single charge of explosive below the weathered layer of the ground. In some cases, however, multiple shots at a plurality of related points are fired simultaneously or in timed sequence. Sometimes acoustic waves are used instead of seismic waves. In this application the two terms "acoustic waves" and "seismic waves" are used synonymously.

The term seismic wave generating station therefore indicates any point or plurality of points at which a single seismic wave or a spatially or temporally related group of seismic or acoustic waves are produced, and may be conveniently designated herein by the letter S, together with a subscript determining its position in a pattern.

In the seismic method the receivers, or receptors, used to detect the disturbances may be of the form of seismometers, geophones, acoustic receivers, or any other suitable vibration pickup. As regularly practiced, electrical waves converted from arriving earth waves at the receivers are amplified electrically, transmitted to a recorder, and recorded as oscillograph traces on photographic paper, usually several on a single strip. Frequently the outputs from several receptors are combined in some manner before the recording. The point in space representing the center of gravity of the receptor is designated by the letter R, together with a subscript denoting position in a pattern.

In performing continuous subsurface exploration in accordance with my invention, the difficulties of identifying the waves from record to record encountered in prior art methods are overcome completely, and continuous coverage of the subsurface strata is obtained in spite of surface obstructions. I am able to completely explore a subsurface formation in spite of surface obstructions and without interference from surface waves by generating sets of seismic waves successively at a plurality of spaced generating points at the surface, receiving and recording each set of waves after oblique reflection from a corresponding series of incidence points on successive extents of the formation, the reception of waves generated at the respective generating points taking place at corresponding series of detecting points, each series of detecting points being located a distance from its corresponding generating point which is large compared to the interval between successive detecting points in said each series. Waves from adjacent extents of the formation under investigation are easily identified in my system by causing waves which are generated at different generating points and which are reflected from substantially identical incidence points in the two adjacent extents to travel over their respective paths in substantially the same time. In some cases waves in sets of waves reflected from two adjacent extents of the formation are caused to travel in opposite senses over substantially identical paths.

According to the method of continuous subsurface surveying commonly in use at the present time, use is always made of a spread of receptors adjacent the shot point. According to my invention, use is to be made of a spread of receptors not adjacent the shot point from which seismic waves originate for recording at said spread. By thus utilizing spreads non-adjacent with the shot points for which the recordings are made, there is no receptor close enough to the source to be seriously disturbed by heavy ground vibration or noise at the source.

Heretofore, the term "spread" has been used to designate a straight line of receptors. For simplicity I desire to use the term "spread" more broadly to designate any continuous line of receptors. When a straight line of receptors is intended, it will be so stated. While I have illustrated my invention with straight spreads, it is clear that broken or curved spreads could be used.

In the drawing, a spread whose end receiving points are near a given shot-hole and extend to an adjacent hole may be referred to as an adjacent spread. Other spreads may be referred to as non-adjacent spreads. The spread just beyond an adjacent spread may be called a next adjacent spread or a spread of the second order; the spread just beyond the next adjacent spread may be called the second next adjacent spread, or a spread of the third order; etc. These definitions apply whether or not the ends of the spreads lie at, just short of, or just beyond the shot points, and whether or not the spreads are in the same line as the generating points. Thus, for example, referring to Fig. 2: With respect to generating station $S_2$, spreads B and C are adjacent spreads, spreads A, D and E are non-adjacent spreads. Spreads A and D are spreads of the second order and spread E is a spread of the third order with respect to station $S_2$. Similarly, spread C is adjacent generating stations $S_2$ and $S_3$ but not adjacent generating stations $S_1$, $S_4$ and $S_5$.

In carrying out my invention, I prefer to select related spread positions in such a manner as to maintain common recordings that will identify waves in a positive manner from record to record. These common traces that correlate records for adjacent parts of the subsurface positively may be made in such a way that the wave-travel times and the reflection points of the waves recorded on the common traces are always close enough together to permit positive identification of the waves from the same reflecting horizon. Elementary examples of my method are illustrated in the drawing.

In Figs. 1, 2 and 3, a line of generating stations have been placed at uniform intervals on the surface at $S_1$, $S_2$, $S_3$, $S_4$, etc. Between these shot points, lines of receiving stations have been placed, although they need not be alined. As illustrated in these examples, however, each line of receiving stations between successive shot points comprises a straight line of receivers terminating with a receiver at or near the generating stations. For example, spread C comprises a continuous line of receiving positions reaching from $S_2$ to $S_3$. Instead of recording waves at spread C when shooting at the ends of the spread at $S_2$ and $S_3$, as in prior methods, I use non-adjacent generating stations. In Fig. 2 the next adjacent shot point has been used; in Fig. 3 the second next adjacent shot point.

As illustrated in Fig. 2, waves originating at $S_1$ and obliquely reflected from a subsurface layer are recorded at spread C, thus covering the part of the subsurface designated as IC between the points $b$ and $c$. Next, a charge is detonated at $S_2$, and obliquely reflected waves recorded at spread A covering the portion of the subsurface designated as 2A between points $a$ and $b$. Here it is to be observed that, except for weathering corrections, differences in shothole depths, et al., there is a common reflecting point at $b$ and a nearly equal wave travel time for one trace on each record. That is, the wave travel time over the paths $S_1$—$b$—$R_{11}$ and $S_2$—$b$—$R_6$ are substantially equal. It is clear, then, that it is fairly simple to recognize waves from an identical bed on the records for the two different set-ups. By referring to Fig. 1, it will be noted that each of the spreads A and C lie outside the area defined by two lines which pass through the respective shot points $S_1$ and $S_2$, and which are substantially perpendicular to a straight line passing through the shot points.

Next, a record is made at spread B for a shot at $S_3$, and the portion of the bed designated as 3B between points $c$ and $d$ covered. At the point $c$ there is an incidence point practically common between the two records, corresponding to the sections IC and 3B of the subsurface bed. Since the wave-travel times over the two paths $S_1$—$c$—$R_{17}$ and $S_5$—$c$—$R_6$ are practically the same except for shot-hole depth corrections, waves from identical beds can be recognized on the two records.

This process may be continued indefinitely along the line of exploration, thereby providing a system for obtaining positive continuous record correlation and at the same time reducing interference due to ground motion and noise from a shot-hole close to any receptor.

At the same time, interference due to ground roll is reduced considerably because the ground roll intensity diminishes greatly with distance. In many cases the distance between the shot point and the spread may be selected with reference to ground roll velocity, in such a manner that the ground roll arrives at the spread long after the desired reflected waves have been recorded. Any well known method for reducing the intensity level of interfering refracted waves, ground roll, and unrest at distant receiving points may be combined with my method to produce a record on which these disturbances are reduced even more.

The application of my method illustrated in Fig. 3 is very similar to the foregoing embodiment of my invention, except that for a given spread the second next adjacent shot point has been used instead of the next adjacent shot point. Shooting at $S_3$ and recording at A, portion 3A of the subsurface is explored. Shooting at $S_1$ and recording at D, portion ID is explored. The two corresponding records have a common trace with approximately the same travel times for waves to the almost identical reflection points at $b$, thus facilitating the recognition of reflected waves from a given reflecting horizon from one record to the next. Shooting from S4 and recording at spread B, the portion 4B is covered on the subsurface layer. By comparison of the two records, waves from a given subsurface layer are readily identified. Repeating this process along the line for the various spreads and shotholes provides another method of positive continuous subsurface surveying, not subject to the objections applicable to prior art methods.

If desired, the third next adjacent spread could be used with each shot point or even higher order non-adjacent spreads, as long as the overall distance from the shot point to the receptor spreads used therewith does not exceed a distance suitable for recording the waves regarding which data is desired.

Ordinarily I am concerned with accomplishing continuous subsurface exploration by utilizing reflected seismic waves, but my method and patterns would also be applicable to systems in which non-seismic waves, or other physical disturbances, are generated at the generating stations $S_1$, $S_2$, $S_3$ and $S_4$, and their effects propagated to a line of non-adjacent detecting points and the effects of such disturbances recorded by apparatus connected to appropriate detectors. The same patterns can be used, for example, for refraction surveying.

In conducting exploration according to prior art methods, it may be impractical to use a generating point of say $S_3$. When using former methods in which recordings are made at adjacent spreads only, the portion of the subsurface lying below $S_3$ and between $d$ and $f$ could not be explored, as can be seen by examining Fig. 2, if $S_3$ cannot be fired. According to my method, however, this portion may be explored by using non-adjacent spreads, receiving from $S_2$ at D and from $S_4$ at C, even though $S_3$ is not used, as can be seen from Fig. 2.

Another case in which my method is very useful occurs when a spread cannot be planted in its regular position. For instance, there might be a stream flowing between the generating points $S_3$ and $S_4$ which would preclude getting satisfactory records from a chain of receivers joining $S_3$ with $S_4$. In exploring the subsurface by former methods there would be a gap between points $e$ and $g$ of Fig. 2. According to my method, however, a spread is not required between the two generating points $S_3$ and $S_4$ in order to explore the subsurface beneath and between these generating points. By using the spreads C and E with the generating points $S_3$ and $S_4$ and recording according to the principles of my invention, I am able to explore the region between $e$ and $g$, as illustrated in Fig. 2.

By extending the spreads used in these two latter examples beyond the neighboring generating stations, I can slightly overlap the subsurface explored otherwise and thereby be assured of obtaining complete subsurface coverage. Other modifications of this system may also be used to obtain complete subsurface coverage, as will appear to those skilled in the art.

The size of the gap between portions of the subsurface explored should preferably be equal to, or less than, the distance between successive incidence points within the same record. However, when the wave form varies but slightly from trace to trace on a given record, as frequently occurs in easy shooting territory, the gap may be larger.

In general, my invention may be thought of as comprising establishing a line of generating points and a line of spreads of receiving points, then shooting at the generating points and recording at non-adjacent spreads, in such a manner as to provide a continuous survey of the subsurface strata.

While I have illustrated my method in connection with a specific pattern of receiving points to be used in conjunction with the generating points, I do not wish to be limited to these specific forms, for the patterns may be varied widely without in any way departing from the spirit of my invention.

For instance, my method of recording at nonadjacent spreads may be used even when the line of generating stations is curved or broken. In this case it is very simple when the line of receivers is substantially the same as the line of generating stations. Whenever the line of receiving stations is offset from the line of generating stations and that line is not straight, application of elementary geometry or the principles of regular reflection will indicate to what extent it is necessary to vary the length of the spreads in order to assure substantially continuous subsurface coverage.

In another modification of my invention, recordings may be made bilaterally, that is, the two recordings from a given shot-hole as $S_3$ at two non-adjacent spreads as B and E, may be made simultaneously for a single shot at the generating station. Many other applications and modifications of my invention will appear to those skilled in the art.

I claim:

1. The method of profiling a subsurface formation comprising generating sets of seismic waves successively at a plurality of spaced generating points, receiving and recording said waves after oblique reflection from corresponding series of incidence points on successive extents of said common formation, the reception of waves generated at the respective generating points occurring at corresponding series of detecting points, each series being located a distance from its corresponding generating point which is large compared to the interval between successive detecting points in said series, whereby continuous exploration of said formation is obtained without interference from slow travelling surface waves.

2. In a method of seismic prospecting wherein seismic waves are generated at two different spaced points, the steps which comprise generating seismic waves at one of said generating points so as to reflect a first set of waves from a subsurface stratum, receiving said reflected waves at a first reference receiving point close to the other of said generating points and also at a first series of receiving points progressively spaced from said first reference point in a direction extending outwardly from said one generating station, generating seismic waves at said other generating station so as to reflect waves from said subsurface stratum, receiving said latter reflected waves at a second reference receiving point close to said one generating point and also at a second series of receiving points progressively spaced from said second reference point whereby the recognition of waves reflected from two adjacent extents of the subsurface is facilitated.

3. A method of seismic prospecting according to claim 2 wherein said waves are received along a second series of receiving points lying on a line spaced outwardly from said other generating point.

4. The method of profiling a subsurface formation including generating a first seismic wave at one generating point, recording said first seismic wave after reflection from said formation at a series of spaced detecting points located at a distance from said generating point large compared to the interval between successive detecting points in said series, generating a second seismic wave at a point adjacent one of said detecting points and recording said second seismic wave after reflection from said formation at said one generating point and also at a series of detecting points spaced from said one generating point and lying outside the space between said two generating points.

5. The method of profiling a subsurface formation which comprises producing a first set of seismic waves at a source above said formation, recording at one set of receiving points reception of said first set of seismic waves each of which waves is obliquely reflected from a series of incidence points progressively spaced on one extent of said formation, producing a second set of seismic waves at a second source above said formation, recording at a second set of receiving points reception of said second set of waves each of which waves is obliquely reflected from a series of incidence points progressively spaced on a second extent of said formation adjacent said first extent and including in the wave paths of the waves recorded for said second extent a wave path substantially identical with a wave path travelled by one of the waves recorded for an adjacent portion of said first extent.

6. In the method of seismic prospecting in which seismic waves are successively generated at each of at least three alined generating points, reflected from a succession of adjacent extents of a subsurface stratum, and thereafter received and recorded, the step which comprises receiving sets of reflected waves at corresponding series of receiving points substantially uniformly spaced and extending substantially between two of said generating points neither one of which is the source of waves being recorded, all the sets of waves recorded for adjacent pairs of said extents including waves which have travelled over substantially identical paths, some of said waves having travelled in opposite senses over at least one of said substantially identical paths.

7. The method of profiling at least one subsurface stratum which comprises producing seismic waves at a first source, receiving and recording waves at a plurality of points substantially in line with said source after being obliquely reflected from one extent of said formation, repeating the process for a second extent of said formation adjacent said first extent, using a second source and a second plurality of receiving points and including in each recording waves which have travelled in opposite senses over substantially identical paths.

8. The method of profiling at least one subsurface stratum which comprises generating seismic waves at a point beneath the earth's surface, receiving and recording waves at a plurality of substantially horizontally spaced points substantially in line with said source after being obliquely reflected from a series of incidence points within one extent of said formation, repeating the process for a succession of adjacent extents of said formation and including in the two recordings of waves reflected from the closest incidence points in each pair of adjacent extents waves which have travelled in opposite senses over substantially identical paths.

9. The method of profiling at least one subsurface stratum which comprises producing seismic waves successively at two spaced sources, receiving and recording waves from each source at a corresponding series of reception points after reflection from a corresponding series of incidence points, said two corresponding series of incidence points lying within two adjacent extents of said stratum, at least one of said series of reception points lying outside the area defined by two lines passing through said sources and being substantially perpendicular to a straight line formed by said sources, the wave-travel times corresponding to an incidence point lying within one extent being substantially equal to a wave travel time corresponding to a neighboring incidence point lying within the second extent.

10. A method according to claim 9 in which the waves are received at series of reception points lying outside said defined area.

11. The method of profiling at least one subsurface stratum which comprises successively producing seismic waves at two spaced sources, receiving and recording waves from each source at a separate corresponding series of reception points after oblique reflection from corresponding series of incidence points lying within two adjacent extents of said stratum, at least one of said series of reception points lying outside the area defined by two lines passing through said sources and being substantially perpendicular to a straight line formed by said sources, said two extents having two substantially identical incidence points, and the wave travel times corresponding to waves reflected at said substantially identical incidence points being substantially identical.

12. A method according to claim 11 in which the waves are received at series of reception points both of which series lie outside said area.

CHARLES GILL MORGAN.